Patented Aug. 11, 1936

2,051,002

UNITED STATES PATENT OFFICE 2,051,002

REFRACTORY COMPOSITION

John McBride Knote, South River, N. J., assignor to Quigley Company, Inc., a corporation of New York No Drawing. Application December 23, 1932, Serial No. 648,644

6 Claims. (Cl. 106—9)

This invention relates generally to the production of a refractory material for making furnace bottoms and walls and is more particularly designed to produce a refractory material which can be applied in a monolithic form as a plastic mass which will harden by hydraulic action, after which it can be burned in situ as the furnace is brought up to operating temperature. The present application deals more especially with such process of lining furnaces, describing one type of composition used for that purpose, while the invention in its broadest aspect is described and claimed in my co-pending application Serial No. 700,081, filed November 28, 1933.

The common practice heretofore has been to mold refractory material into bricks, "burn" these in a kiln, and then build up the furnace lining or other heat resisting body out of these bricks which must be bonded and held together by a costly, high temperature cement.

It has long been known that the chromites, i. e. high grade chromium ores containing from 40% to 60% of chromium oxide ($Cr_2O_3$), form excellent base materials for making high grade refractory linings, but such ores are non-plastic, and the provision of a suitable binding material for use with them, and which shall withstand high temperatures to which it must be subjected and function properly to cause the chromite masses to harden and hold their shapes at such temperatures, has been a problem.

The limiting formulae for such chromite ores average about as follows:

| | Per cent |
|---|---|
| Chromium oxide $Cr_2O_3$ | 40 –60 |
| Silica $SiO_2$ | 3.3– 8 |
| Iron oxide FeO | 0–17 |
| Magnesium oxide $MgO_2$ | 0.0–15 |
| Aluminum oxide $Al_2O_3$ | 0.0–22 |

It has been proposed to use a minor proportion of quick hardening, calcium aluminate cement also known as "fused cement", for this purpose. It has also been proposed to mix the chromite ore and this cement in about the proportion of one part by weight of the cement to five parts of the chromite, and enough water to make a plastic mass which may be applied in the monolithic form, or by casting in molds. Such procedure is described in United States patent to Jegor Israel Bronn, No. 1,780,114, granted October 28, 1930, and my present invention in some aspects constitutes a further improvement on the invention described in said Bronn patent.

Such simple mixture of cement and chromite as claimed in said Bronn patent, has, however, developed a fatal defect for use at even forge furnace temperatures. While it will not melt, or slag down, it then becomes so fragile that the mass disintegrates under even slight external pressure, or of its own weight.

The purpose of my present invention is to devise a plastic lining which will set and harden by the chemical reactions of its constituents within twenty-four hours or thereabouts, and which will develop high refractory qualities if immediately after such hardening it is heated by firing the furnace in the usual way to working temperatures, thereafter withstanding the usual shocks and stresses encountered in the ordinary operation of the furnace. It is essential for the purposes of my invention that a mixture of refractories be produced which will so set and harden by internal reactions, as distinguished from hardening by drying which proceeds slowly from the outer surface inward, and thereafter become sintered and further hardened by the initial heating of the furnace lined with it to the working range of temperatures at which most common metals and some alloys are melted, i. e., from 2300° to 2600° or 2700° Fahrenheit. It is also essential that such lining shall hold its physical strength and rigidity throughout that range of temperatures and withstand the erosive action of such molten metals and slags occurring or produced in the melting operation.

To save time and the consequent expense of overhead charges, it is desirable that such lining composition shall thus harden quickly after being placed in working position in the furnace so that the "burning" or final completion of the refractory lining may be begun by starting the initial heating of the furnace in the usual way very soon after such lining has been applied to its walls and bottom and such heating carried out as rapidly as is usual and proper, since if a slow burning of the lining where necessary before regular use of the furnace is begun, or if a heating to a temperature above that of ordinary furnace operation were required, obviously both time and fuel would be thereby wasted.

This last mentioned quality, and capacity of such prompt hardening and subsequent immediate burning by ordinary heating of the furnace were and are characteristic of the simple compound of chromite and high aluminate cement described and claimed in said Bronn patent, but failure of such simple lining so produced to stand up under ordinary mechanical or ordinary gravitational stresses and erosion from the charge limited its field of usefulness and left unsolved the additional problem of developing a lining of this character for general furnace use at temperatures of 2300° Fah. and higher.

After a long series of experiments and tests made under practical conditions with many different materials I have found that the difficulty above described is overcome if a proper proportion of a thoroughly sintered crushed dolomite, (a native carbonate of calcium and magnesium having the formula $CaMgCO_3$) is added to the original mix above described. Roughly the proportions of the solids should be, by weight, five parts crushed chromite, one part calcium aluminate cement and one part crushed and sintered dolomite, though the quantities of cement and dolomite may each vary from 5% to 40% of the mass according to special requirements.

A typical mixture embodying my invention would show, by chemical analysis, about the following percentages of its chemical constituents:

|   | Per cent |
|---|---|
| Chromium oxide | 38 |
| Silica | 4 |
| Iron oxide (FeO) | 11 |
| Alumina | 21.5 |
| Magnesia | 15 |
| Lime (CaO) | 10.5 | the sintering having altered the dolomite into a double oxide of lime and magnesium, the magnesium oxide then remaining being in the form of free magnesia. The above analysis is based on a mixture in the proportions first above given and would be changed considerably if the proportion of dolomite were increased to the maximum limit last above stated.

On the addition of water the above described mix becomes sufficiently plastic to be applied directly as a monolithic covering to the surfaces to be protected from heat. It molds easily and sets and hardens quickly, so that a furnace may be "fired" as soon as the lining has hardened, (which requires about 18 to 24 hours time), thus "firing" or "burning" the monolithic lining in situ. The material may also be molded into bricks, with or without "firing" in a brick kiln, and a furnace lining built up in the usual way with such bricks. The material does not spawl or crack when thus heated immediately and rapidly, and after being so hardened it forms one of the most refractory of linings.

As at present advised the beneficial action of the thoroughly sintered, crushed dolomite results, as I believe, from its supplying a sufficient quantity of free magnesia for combination at working temperatures in metallurgical furnaces with the alumina of the then dehydrated cement to create a high temperature bond that holds the chromite particles and other uncombined materials together and so forms the resultant hard, tough, highly refractory mass which my invention produces. Perhaps such magnesia and alumina when so heated, while in intimate contact under the conditions obtaining in the crystallized mass formed by the setting of said cement, may unite to form the well known magnesia-alumina spinel which has often heretofore been produced synthetically.

Having described my invention, I claim:

1. A composition for lining a furnace which will be rendered refractory by the heat generated at working temperatures therein which comprises about one part by weight of an hydraulic cement having a high content of alumina and one part of crushed and thoroughly sintered dolomite with about five parts of crushed chromite.

2. A composition for lining a furnace which will be rendered refractory by the heat generated at working temperatures therein, which comprises crushed chromite, crushed and thoroughly sintered dolomite, and an hydraulic cement having a high content of alumina, said cement comprising about one-seventh by weight of the completed mixture, a quantity sufficient after complete hydration by the addition of enough water to said originally dry mixture at room temperature, and the resultant hardening thereof to have transformed the entire mixture into a monolithic mass.

3. A mixture for making furnace linings such as defined in claim 2 in which the said dolomite constitutes about forty per cent thereof by weight.

4. A composition such as defined in claim 1 in which the hydraulic cement having a high content of alumina therein specified is that known as calcium aluminate cement, sometimes called fused cement.

5. A composition such as defined in claim 2 in which the hydraulic cement having a high content of alumina therein specified is that known as calcium aluminate cement, sometimes called fused cement.

6. A plastic composition suitable for lining a furnace which will set at atmospheric temperatures and thereafter be rendered refractory by the heat generated at working temperatures in such furnace which comprises crushed chromium iron ore, approximately 15% of magnesia, and calcium aluminate cement having a high alumina content together with enough water to hydrate said cement.

JOHN McBRIDE KNOTE.